Patented Apr. 29, 1924.

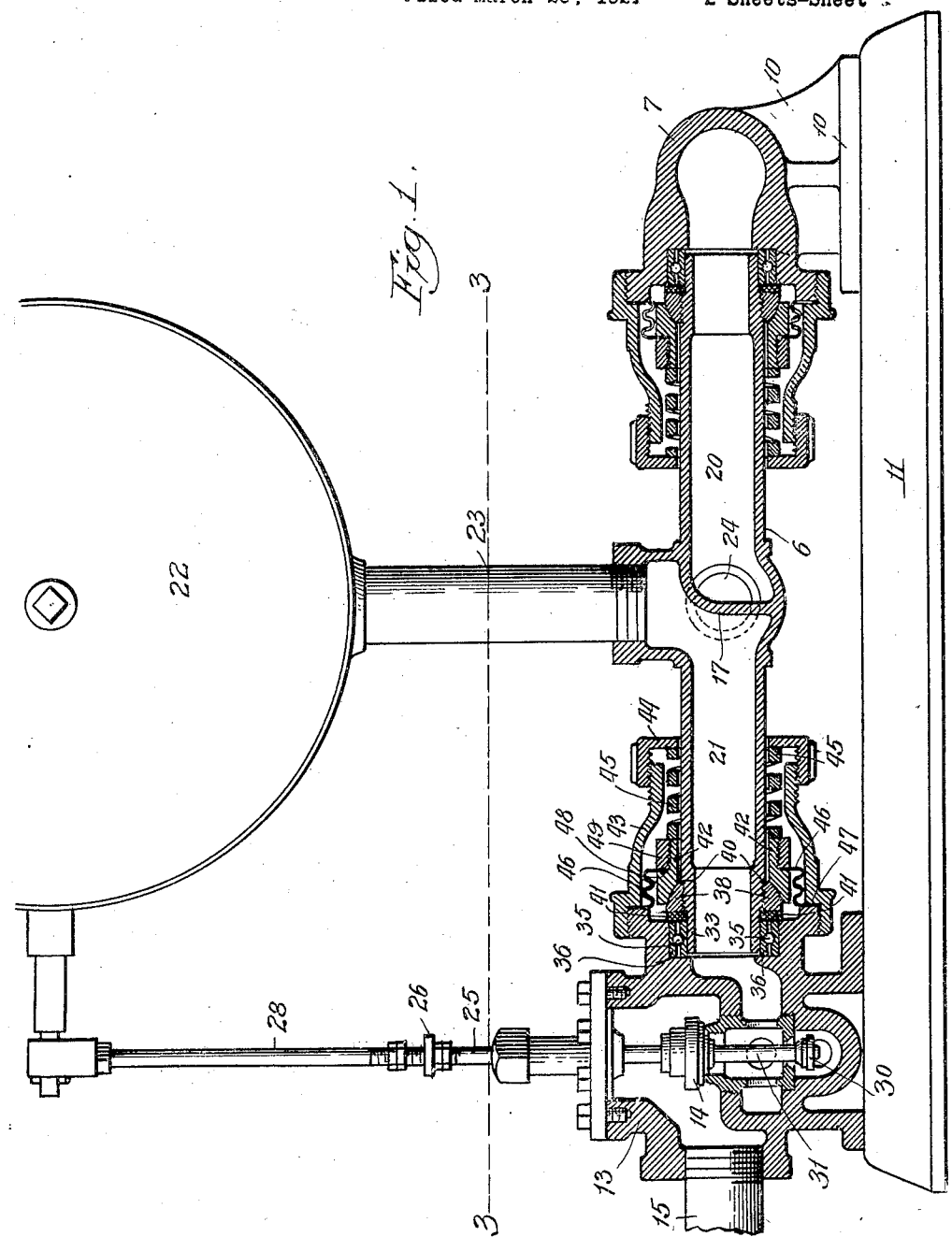

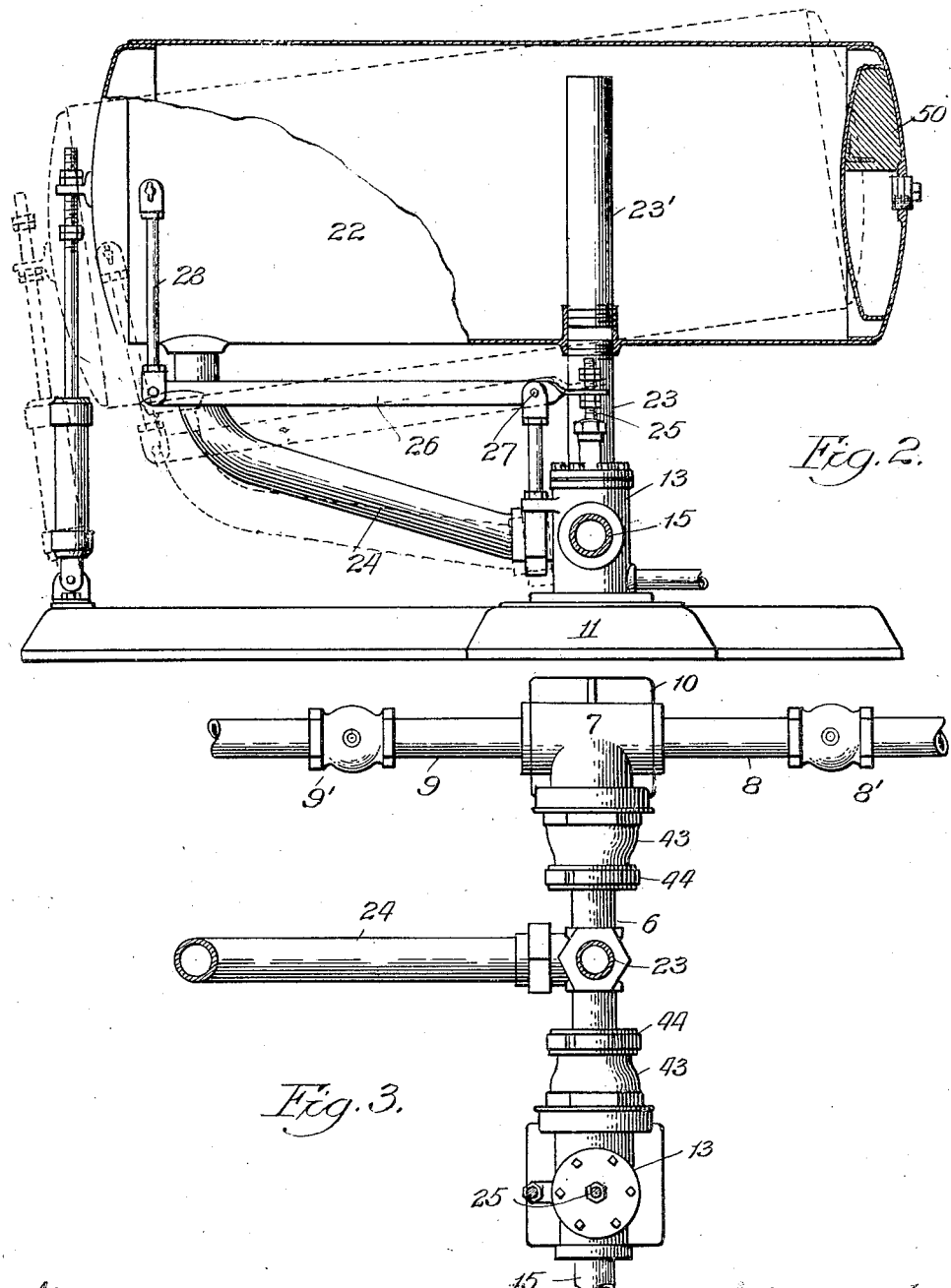

1,492,364

UNITED STATES PATENT OFFICE.

HUBERT C. ELLIS, OF EVANSTON, ILLINOIS, ASSIGNOR TO ELLIS DRIER & ELEVATOR COMPANY, OF CHICAGO, ILLINOIS, A CORPORATION OF WISCONSIN.

TILTING TRAP.

Application filed March 23, 1921. Serial No. 454,822.

*To all whom it may concern:*

Be it known that I, HUBERT C. ELLIS, a subject of the King of Great Britain, and a resident of Evanston, in the county of Cook and State of Illinois, have invented certain new and useful Improvements in Tilting Traps, of which the following is a full, clear, and exact description.

The invention relates to tilting traps and its object is to provide a trap of this type in which the trunnion pipe for the drum is pivotally supported in such manner as to effectively prevent leakage of steam. Another object is to prevent variation in the operation of the trap as a result of varying frictional resistance on the pipe from expansion and contraction of the pipe and without permitting leakage at the pipe-joints.

The invention consists in the several novel features hereinafter set forth and more particularly defined by claims at the conclusion hereof.

In the drawings: Fig. 1 is a transverse section of a condenser trap embodying the invention. Fig. 2 is a side elevation, parts being shown in section. Fig. 3 is a horizontal section taken on line 3—3 of Fig. 1.

The invention is exemplified in a trap comprising a trunnion-pipe 6, one end of which is in communication with a stationary fitting 7, to which the inlet-pipe 8 and the outlet-pipe 9 for the condensate are connected. Fitting 7 is usually provided with a bottom flange 10 which is bolted to a base 11. The other end of the trunnion-pipe is in communication with a valve-casing 13 containing a steam cut-off 14 for controlling the delivery of live steam to discharge the condensate from the drum. A pipe 15 is connected to the casing 13 to supply live steam thereto so that when the cut-off 14 is opened, steam will pass into one end of the trunnion pipe. A wall 17 divides the space in the trunnion pipe so as to form therein a duct 20 for the condensate and a steam duct 21. A drum 22 is supported from the trunnion-pipe by a riser pipe 23 and an elbow pipe 24. Elbow pipe 24 conducts condensate from the duct 20 in the trunnion-pipe into and from the drum. Riser-pipe 23 conducts live-steam from the duct 21 in the trunnion pipe to the top of the drum which is provided with extension pipe 23′ for this purpose. The stem 25 of the admission valve 14 is operatively connected to a lever 26 which is pivoted on a stationary fulcrum 27 and is connected by a link 28 to the drum 22 so that when the drum is tilted and lowered by a column of condensate therein, lever 26 will operate stem 25 to open valve 14 and supply live steam from pipe 15 to the drum through valve-casing 13, duct 21 and pipes 23, 23′ to the space above the condensate and thus force it through elbow-pipe 24, duct 20, and into discharge pipe 9, it being understood that pipes 8 and 9 are provided with check-valves 8′ and 9′ to prevent back-flow of the condensate. A valve 30 is connected to valve 14 by a stem 31 to provide a vent while the condensate is being delivered into the drum. This relief-valve 30 will be closed when the steam-admission valve 14 is open and vice versa. A suitable counterweight 50 is usually provided to provide for the return of the drum to its normal position after the condensate has been discharged therefrom.

In the operation of condenser traps, great difficulty has been experienced in preventing leakage between the trunnion-pipe and the stationary fittings for the condensate and live steam. Packing boxes have been found to be unsatisfactory, because, when the packing was kept tight, the friction upon the pipe was so great as to interfere with the free operation or tilting of the drum responsively to a predetermined accumulation of condensate. In other cases, leakage resulted from the expansion and contraction of the trunnion-pipe resulting from changes in temperature. The primary object of the present invention is to provide a trap in which the trunnion-pipe, whereby the drum is supported, will be supported so that there will be no leakage of fluid and so that there will be no substantial variation in the frictional resistance applied to the trunnion-pipe. In attaining this object, both ends of the trunnion-pipe are similarly supported and connected, so that a description of one connection and support will suffice for both.

Each end 33 of the trunnion-pipe is supported by anti-friction balls 35 which run in the adjacent fitting and are held in a suitable retainer 36. Clearance is left between the end of the trunnion-pipe and the fitting to permit longitudinal expansion and contraction of the pipe. A bearing-ring 38 is screw-threaded to the trunnion-pipe inwardly of the anti-friction bearing and forced tightly against a shoulder 40 so fluid cannot leak between the ring and the pipe. A packing ring 41 is disposed between the outer end of bearing-ring 38 and the adjacent fitting and this packing is lubricated with graphite or other suitable lubricant. A stationary bearing ring 42 bears against the inner face of ring 38, the contacting faces of said rings being ground to form a tight joint and may, if desired, be tapering as shown. Packing-ring 41 measurably prevents the escape of fluid from the anti-friction bearing to said joint. A sleeve 43 is screw-threaded to the inner end of the adjacent stationary fitting and a flanged collar 44 is screw-threaded to the inner end of said sleeve to house the joint. A coil-spring 45 is interposed between the collar 44 and the stationary bearing-ring 42 to hold the coacting bearing rings 38, 42 in snug contact. The force of the spring may be varied by adjusting the collar 44. A metallic diaphragm 46 has its outer margin clamped between the stationary fitting and a shoulder 47 on the sleeve 43 and its inner margin is clamped between a shoulder 48 on the bearing-ring 42 and a collar 49 which is screw-threaded to said ring.

This diaphragm is corrugated so that it will permit the non-rotatable bearing ring to follow the trunnion-pipe as the latter contracts or expands and prevents any leakage of fluid between the non-rotatable ring and the fitting. The spring 45 holds the ground faces of the bearing rings 38 and 42 in snug contact despite expansion or contraction of the trunnion pipe. The anti-friction bearings minimize the friction resisting the rotation of the trunnion pipe.

As a result of this construction, the tilting condenser trap provides against a leakage of fluids between the trunnion pipe and its stationary supports and substantial variation in frictional resistance, such as results from tightening and loosening of packing which causes fluctuation in the load which will tilt the drum, is avoided. The springs automatically take up any wear at the joints and may be adjusted to vary the pressure between the stationary and rotatable bearing rings. In many instances, in construction heretofore used, leakage resulted from failure to adjust or renew the packing in the joints and this is overcome by the present invention, because the wear of the metallic bearing-rings is slight and, what little there is, is automatically taken up and, therefore, no attention is necessary to prevent leakage.

The invention thus exemplifies a condenser-trap which is provided with a trunnion-pipe and non-leaking connections which operate without excessive or fluctuating resistance.

The invention is not to be understood as restricted to the details set forth, since these may be modified within the scope of the appended claims, without departing from the spirit and scope of the invention.

Having thus described the invention, what I claim as new and desire to secure by Letters Patent:

1. In a tilting trap, the combination of a drum, a trunnion-pipe upon which the drum is carried, stationary fittings to which the ends of the trunnion-pipe are connected and pivotal connections between the fittings and the trunnion pipe, one of which connections comprises a bearing-ring fixed to the trunnion-pipe, a non-rotatable bearing-ring in contact with said bearing ring on the trunnion pipe, and a flexible diaphragm between the non-rotatable ring and one of the fittings, the contact between the rings being such as to permit free rotation of the pipe by the drum.

2. In a tilting trap, the combination of a drum, a trunnion-pipe upon which the drum is carried, stationary fittings to which the ends of the trunnion pipe are connected and pivotal connections between the fittings and the trunnion-pipe, one of which connections comprises a bearing-ring fixed to the trunnion-pipe, a non-rotatable bearing-ring in contact with said bearing ring on the trunnion pipe, a flexible diaphragm between the non-rotatable bearing ring and one of the fittings and means for pressing the bearing rings together, the contact between the rings being such as to permit free rotation of the pipe by the drum.

3. In a tilting trap, the combination of a drum, a trunnion-pipe upon which the drum is carried, stationary fittings to which the ends of the trunnion pipe are connected and pivotal connections between the fittings and the trunnion-pipe, one of which connections comprises a bearing-ring fixed to the trunnion-pipe, a non-rotatable bearing-ring in contact with said bearing ring on the trunnion pipe, a diaphragm between the stationary ring and one of the fittings, a sleeve adapted to clamp one margin of the diaphragm to said latter fitting, the contact between the rings being such as to permit free rotation of the pipe by the drum.

4. In a tilting trap, the combination of a drum, a trunnion pipe upon which the drum is carried, stationary fittings to which the ends of the trunnion-pipe are connected and pivotal connections between the fittings and the trunnion-pipe, one of which connections comprises a bearing-ring fixed to the trunnion-pipe, a non-rotatable bearing-ring in contact with said bearing ring on the trunnion pipe, a diaphragm between the non-rotatable ring and one of the fittings, a sleeve connected to the fitting and adapted to clamp the outer margin of diaphragm thereto, and a collar for clamping the inner margin of diaphragm to the non-rotatable ring, the contact between the rings being such as to permit free rotation of the pipe by the drum.

5. In a tilting trap, the combination of a drum, a trunnion-pipe upon which the drum is carried, stationary fittings to which the ends of the trunnion pipe are connected and pivotal connections between the fittings and the trunnion-pipe, one of which connections comprises a bearing-ring fixed to the trunnion-pipe, a non-rotatable bearing-ring in contact with said bearing ring on the trunnion pipe, and a spring for forcing said bearing-members together, both of said rings being movable longitudinally when the pipe contracts and expands, the contact between the rings being such as to permit free rotation of the pipe by the drum.

6. In a tilting trap, the combination of a drum, a trunnion-pipe upon which the drum is carried, stationary fittings to which the ends of the trunnion pipe are connected and pivotal connections between the fittings and the trunnion-pipe, one of which connections comprises a bearing-ring fixed to the trunnion-pipe, a non-rotatable bearing-ring in contact with said bearing ring on the trunnion pipe, a spring for forcing said bearing-members together, both of said rings being movable longitudinally with the pipe, and means for preventing leakage between the non-rotatable ring and one of the fittings, the contact between the rings being such as to permit free rotation of the pipe by the drum.

7. In a tilting trap, the combination of a drum, a trunnion-pipe upon which the drum is carried, stationary fittings to which the ends of the trunnion-pipe are connected and pivotal connections between the fittings and the trunnion-pipe, one of which connections comprises an anti-friction bearing between one end of the trunnion-pipe and one of the fittings and adapted to radially support the pipe, a bearing-ring fixed to the trunnion-pipe, a non-rotatable bearing ring in contact with said bearing ring on the trunnion pipe, and a spring for forcing said bearing-rings together.

8. In a tilting trap, the combination of a drum, a trunnion-pipe upon which the drum is carried, fittings to which the ends of the trunnion-pipe are connected and pivotal connections between the fittings and the trunnion pipe, one of which connections comprises an anti-friction bearing between one end of the trunnion-pipe and one of the fittings, a bearing ring fixed to the trunnion-pipe, a non-rotatable bearing-ring in contact with said bearing ring on the trunnion pipe, a spring for forcing said bearing-members together, and means for preventing leakage between the non-rotatable ring and the latter fitting.

9. In a tilting trap, the combination of a drum, a trunnion-pipe upon which the drum is carried, fittings to which the ends of the trunnion-pipe are connected and pivotal connections between the fittings and the trunnion-pipe, one of which connections comprises an anti-friction bearing between one end of the trunnion-pipe and one of the fittings, a bearing ring on the trunnion-pipe, a non-rotatable bearing ring in contact with the bearing ring on the trunnion pipe and movably connected to the latter fitting, means for pressing the bearing-rings in contactual relation, and an elastic packing between the anti-friction bearing and the ring on the trunnion-pipe.

10. In a tilting trap, the combination of a drum, a trunnion-pipe upon which the drum is carried, fittings to which the ends of the trunnion-pipe are connected and pivotal connections between the fittings and the trunnion pipe, one of which connections comprises an anti-friction bearing between one end of the trunnion-pipe and one of the fittings, a bearing ring on the trunnion-pipe, a non-rotatable bearing ring in contact with the bearing ring on the trunnion pipe, a diaphragm between the non-rotatable ring and the latter fitting, means for holding the rings in contactual relation, and an elastic packing between the anti-friction bearing and the ring on the trunnion-pipe.

HUBERT C. ELLIS.